June 14, 1932.  T. J. BENSON  1,863,235
WHEEL LOCK
Filed Aug. 10, 1931  2 Sheets-Sheet 2
Fig. 5.
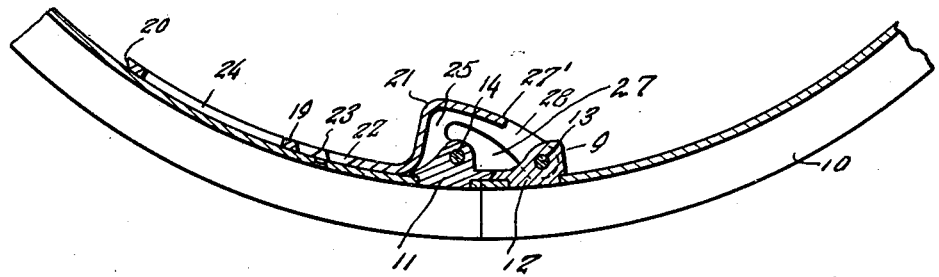
Fig. 6.
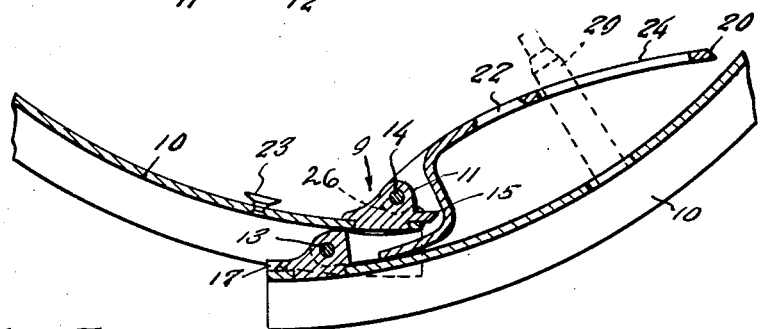
Fig. 7.
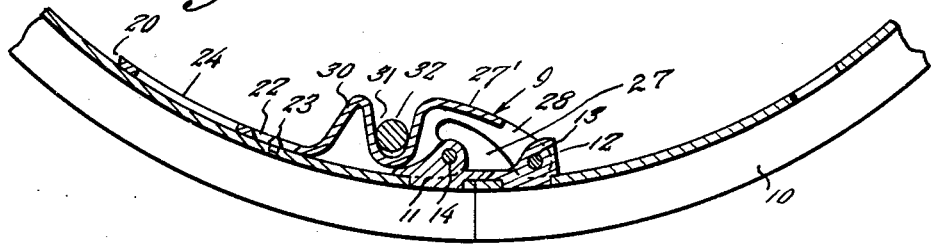
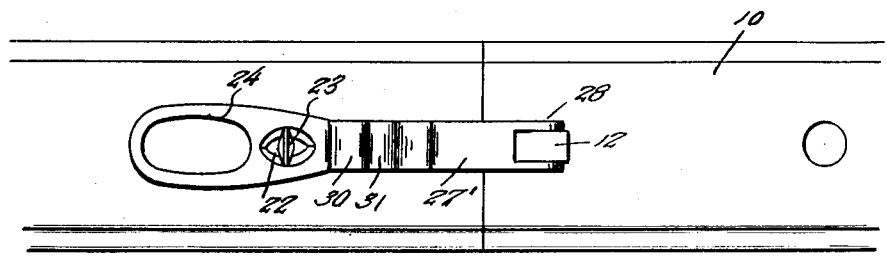
Fig. 8.
Inventor
Thomas J. Benson
By Clarence A. O'Brien
Attorney Patented June 14, 1932

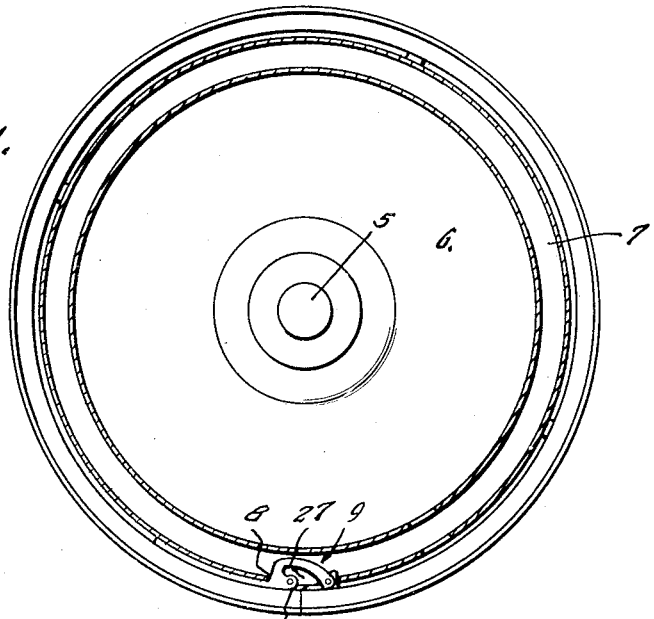
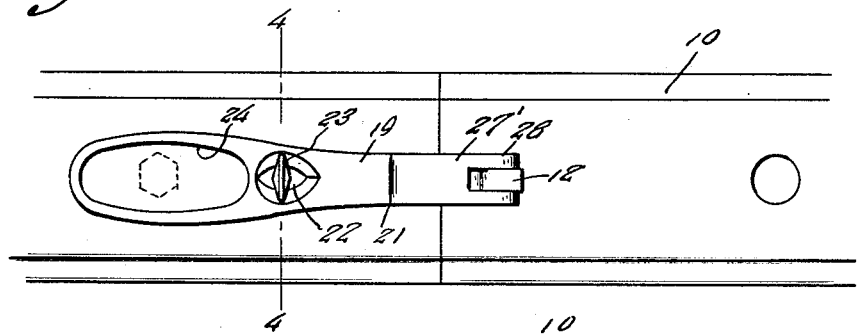
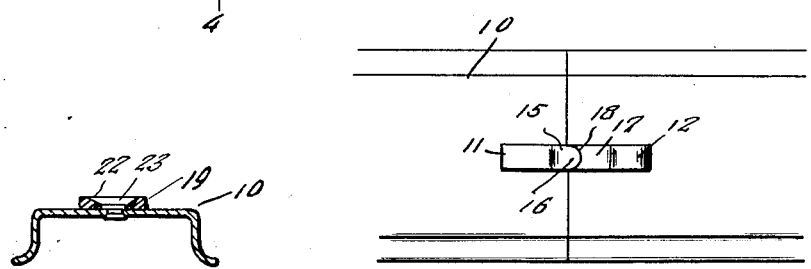

1,863,235

UNITED STATES PATENT OFFICE

THOMAS J. BENSON, OF MELCHER, IOWA

WHEEL LOCK

Application filed August 10, 1931. Serial No. 556,290.

This invention appertains to new and useful improvements in wheel locks, wherein the rim and pneumatic tire, and the wheel proper, are locked together against independent circumferential motion.

An important object of the invention is to provide a contracting and expanding device for the rim of a pneumatic wheel, wherein the device serves to cooperate with the wheel proper as a lock to prevent independent circumferential movement between the rim and the wheel proper.

Another important object of the invention is to provide a rim contracting and expanding device which will require no accessories to operate, and no pressure excepting a slight manual effort on the part of the person operating the device.

Other important objects and advantages of the invention will become apparent to the reader of the following specification.

In the drawings:

Figure 1 represents a vertical sectional view through a wheel and rim, showing the novel device installed thereon, the wheel being of the disk type.

Figure 2 represents a fragmentary plan view of the device installed on a rim.

Figure 3 represents a fragmentary plan view showing the studs and interlocking means without the lever section.

Figure 4 represents a cross sectional view taken substantially on line 4—4 of Figure 2.

Figure 5 represents a fragmentary circumferential sectional view showing the device with the rim in expanded position.

Figure 6 represents a fragmentary circumferential sectional view showing the rim in contracted position.

Figure 7 represents a fragmentary circumferential sectional view, showing the lever deformed to receive one of the cross bolts of a bolted wheel felly.

Figure 8 represents a fragmentary plan view disclosing the modification shown in Figure 7.

Referring to the drawings wherein like numerals designate like parts, it can be seen that numeral 5 represents a disk wheel whose body portion is denoted by numeral 6 and which includes the metallic felly 7 having an opening 8 therein to accommodate the novel expanding and contracting device generally referred to by numeral 9. The presence of this device projecting into the opening 8 obviously prevents circumferential movement between the rim 10 and the felly 7.

In carrying out the invention, it will be seen that a pair of studs 11 and 12 are secured by riveting, welding, or by any other suitable means to the opposite free end portions of the aforementioned rim 10. Each of these studs is provided with a transversely extending opening, one to accommodate the pin 13, and the other to accommodate the pin 14. Extending from the stud 11 is a projection 15 having a rounded end portion 16, while projecting toward the projection 15 from the stud 12 is another projection 17 which is provided with an arcuate-shaped cut-out 18 to snugly receive the curved end portion 16 of the projection 15. Thus, these projections 15 and 17 serve as interlocking means between the ends of the rim 10 to prevent any undue strain in a lateral direction on the leverage structure which will now be described.

This leverage structure includes a curved handle 19 having one end under-beveled as at 20, while its opposite end portion is offset radially as at 21. Adjacent its offset portion 21 is an ovate shaped opening 22 the edge portion of which is beveled to provide a wedging taper for the turn button 23 which is suitably swiveled to the rim 10. The opening 22 will receive the button 23 when the same is disposed longitudinally with the opening 22, and as the button passes through the opening 22, the same can be rotated to the cross-wise position shown in Figure 2 for firmly securing the handle 19 against the rim. This handle is sufficiently curved to conform with the general curvature of the rim and is provided with another opening 24, somewhat larger than the opening 22, mainly to decrease the weight and to save material in manufacture.

In all probability, the contracting and expanding device will be stamped from sheet metal and in so doing, the radially disposed portion 21 will be provided with flanges 25 from each of which an ear 26 will project, so that recess 27 will result extending inwardly beyond the stud 11 from the adjacent rim end. The ears 26 are apertured to receive the ends of the pin 14, thus pivotally connecting the leverage structure at this point to the rim. Extending from the radial portion 21 in the general direction of the handle 19 but away from the same is the extension 27' which has a pair of legs 28 extending therefrom with apertures therein to accommodate the ends of the pin 13.

It will be observed that when the button 23 is released from the handle 19, the fingers of the operator can be engaged under the beveled end portion 20 for moving the handle away from the rim 10. Due to the increased leverage but slight effort is necessary to break the rim and when the handle has been swung to the position shown in Figure 6, the opening 24 will receive the usual valve stem 29, while the end portion of the rim 10 carrying the stud 11 will be reposed in the recessed portion 27, with the projection 15 extending into the space between the afore-mentioned flanges 25.

As before stated, it appears that the last described inwardly disposed portion of the contracting and expanding device engaging into the opening 8 of the belly 7, there can be no independent movement of the rim with respect to the wheel, thus providing a wheel lock.

Figure 8 as well as Figure 7 discloses a modification of the invention, but only to the extent that a hump 30 is provided in the handle 19 between the opening 22 and the radially disposed portion 21, so as to provide a cavity 31, into which one of the usual cross bolts 32 on a spoke type wheel can rest and in this instance, a wheel lock is also provided in a simple and easily reproduced manner.

It will now be observed that the invention involves numerous merits and advantages not specifically recited and while the foregoing specification sets forth the invention in specific terms, it is to be understood that numerous changes in the shape, size, and materials may be resorted to without departing from the spirit and scope of the invention as claimed hereinafter.

What is claimed is:

In a structure of the class described, a transversely split annular rim, lugs carried by the meeting portions of the rim and having beveled ends for contact with each other, one of said lugs being extended beyond that end portion of the rim by which it is carried into overlapping relation with the other end portion of the rim, and a lever having one end portion offset and provided with parallel side flanges provided with ears pivoted to one of said lugs, said flanges being provided with continuations in spaced parallel relation and forming legs pivotally connected to the other lug, the offset terminal portion of said lever being in overhanging relation to one of said lugs.

In testimony whereof I affix my signature.

THOMAS J. BENSON.